US006983602B2

(12) United States Patent
Senile

(10) Patent No.: US 6,983,602 B2
(45) Date of Patent: Jan. 10, 2006

(54) EJECTOR COOLED NOZZLE

(75) Inventor: Darrell Glenn Senile, Oxford, OH (US)

(73) Assignee: General Electric Company, Schenectady, NY (US)

( * ) Notice: Subject to any disclaimer, the term of this patent is extended or adjusted under 35 U.S.C. 154(b) by 260 days.

(21) Appl. No.: 10/828,643

(22) Filed: Apr. 21, 2004

(65) Prior Publication Data

US 2005/0235628 A1 Oct. 27, 2005

(51) Int. Cl.
*F02K 1/12* (2006.01)

(52) U.S. Cl. .................................... 60/771; 239/265.41

(58) Field of Classification Search .................. 60/770, 60/771; 239/265.19, 265.33, 265.37, 265.39, 239/265.41

See application file for complete search history.

(56) References Cited

U.S. PATENT DOCUMENTS 4,128,208 A 12/1978 Ryan et al.
4,176,792 A 12/1979 McCardle, Jr.
5,335,489 A * 8/1994 Thayer ........................ 60/230
5,364,029 A 11/1994 Barcza
5,484,105 A 1/1996 Ausdenmoore et al.
5,485,959 A 1/1996 Wood et al.
5,680,755 A 10/1997 Hauer et al.
5,839,663 A * 11/1998 Broadway et al. ..... 239/265.35
5,842,643 A 12/1998 Lippmeier
6,347,510 B1 2/2002 McAlice et al.
6,360,528 B1 3/2002 Brausch et al.
6,398,129 B1 * 6/2002 Johnson ................ 239/265.37
2002/0036241 A1 3/2002 Johnson

OTHER PUBLICATIONS

"F-16 LOAN Low Observable Asymmetric Nozzle", http://www.f-16.net/reference/versions/f16_loan.html, Jan. 23, 2004, 1 page.

"F-16 Fighting Falcon Production Block Designations", http://www.habu2.net/vipers/viperblocks/, Jan. 23, 2004, 14 pages.

* cited by examiner

*Primary Examiner*—Ehud Gartenberg
(74) *Attorney, Agent, or Firm*—William Scott Andes; Steven J. Rosen

(57) ABSTRACT

A gas turbine engine exhaust nozzle includes a divergent section located aft of a convergent section and a throat therebetween. An exterior fairing is spaced radially outwardly of the divergent section. An ejector cooling air flowpath leads from an ejector cooling air inlet in an aft portion of the fairing to a cooling air ejector in the nozzle. An annular nozzle plenum may be disposed between the divergent section of the nozzle and the external fairing and be part of the ejector cooling air flowpath between the ejector cooling air inlet and the ejector. A plurality of divergent flaps and divergent seals in the divergent section may employ cooling air passages, such as slots, to serve as the ejector. The fairing may include a plurality of circumferentially adjacent exterior flaps and exterior seals and employ truncated ends of or apertures in the exterior seals as the ejector cooling air inlet.

14 Claims, 4 Drawing Sheets

EJECTOR COOLED NOZZLE

BACKGROUND OF THE INVENTION

1. Field of the Invention

The invention relates to aircraft gas turbine engines and, particularly, to ejector cooling of flaps and/or seals of the exhaust nozzle.

2. Description of Related Art

Hot aircraft gas turbine engine exhaust nozzles emit infrared radiation (IR) which is highly undesirable for military combat aircraft. Such aircraft engines include variable area axisymmetric, axisymmetric vectoring, and two dimensional convergent/divergent (CD) nozzles. Convergent and divergent flaps and seals confine hot exhaust flow and typically are used to provide variable throat area and exit area nozzles. These flow confining elements get hot and the divergent flaps and seals provide an unwanted infrared radiation (IR) signature for the engine and aircraft. Infrared radiation from gas turbine engines is conventionally suppressed by shielding and cooling the hot metal structures of the engine. Nozzles may also require or make use of cooling for structural reasons. Cooling air is conventionally drawn from the fan section or a compressor section of the gas turbine engine which is expensive in terms of fuel and power consumption. Nozzles including cooling air ejectors, such as the type used on some General Electric J79 engine models, have employed slot type ejectors to induct ambient cooling air from the atmosphere to supplement the engine supplied cooling air in order to reduce the use of the more expensive engine air.

Such ejecting nozzles provided cooling for variable nozzle throats but often require expensive compressor air for cooling or have trouble providing sufficiently pressurized air for cooling. Thus, it is highly desirable to provide a nozzle having ejector cooling that is inexpensive to use from an engine power perspective and operates effectively over a wide range of engine operating conditions.

SUMMARY OF THE INVENTION

An aircraft gas turbine engine convergent/divergent (CD) exhaust nozzle circumscribing a nozzle centerline includes a divergent section located aft of a convergent section and a throat therebetween. An exterior fairing surrounds and is spaced radially outwardly of at least the divergent section. An ejector cooling air flowpath leads from an ejector cooling air inlet in an aft portion of the fairing to a cooling air ejector in the nozzle. An exemplary embodiment of the nozzle further includes an annular nozzle plenum radially bounded by the divergent section of the nozzle and the external fairing. The ejector cooling air flowpath further includes the nozzle plenum between the ejector cooling air inlet and the ejector.

The exemplary embodiment of the nozzle further includes a plurality of circumferentially adjacent convergent flaps and convergent seals in the convergent section, pivotably mounted to an outer engine casing, and being pivotable relative to the centerline axis. A plurality of divergent flaps and divergent seals are in the divergent section and circumferentially disposed aft of and pivotably connected to the convergent section. The ejector is operable to cool the divergent flaps and seals. The ejector may include cooling air passages in the divergent flaps and seals, and the cooling air passages may be slots.

The exterior fairing in the exemplary embodiment of the nozzle further includes a plurality of circumferentially adjacent exterior flaps and exterior seals. Aft ends of the exterior flaps are pivotally attached to aft ends of the divergent flaps and forward ends of the exterior flaps and seals of exterior fairing are pivotally attached to the outer casing. The exterior fairing includes truncated ends of the exterior seals serving as the ejector cooling air inlet. Each of the truncated ends is located radially inwardly of and between circumferentially adjacent ones of the exterior flaps.

The exterior fairing in one alternative embodiment of the nozzle includes apertures in the exterior seals serving as the ejector cooling air inlet. Each of the apertures being located radially inwardly of and circumferentially between adjacent ones of the exterior flaps.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
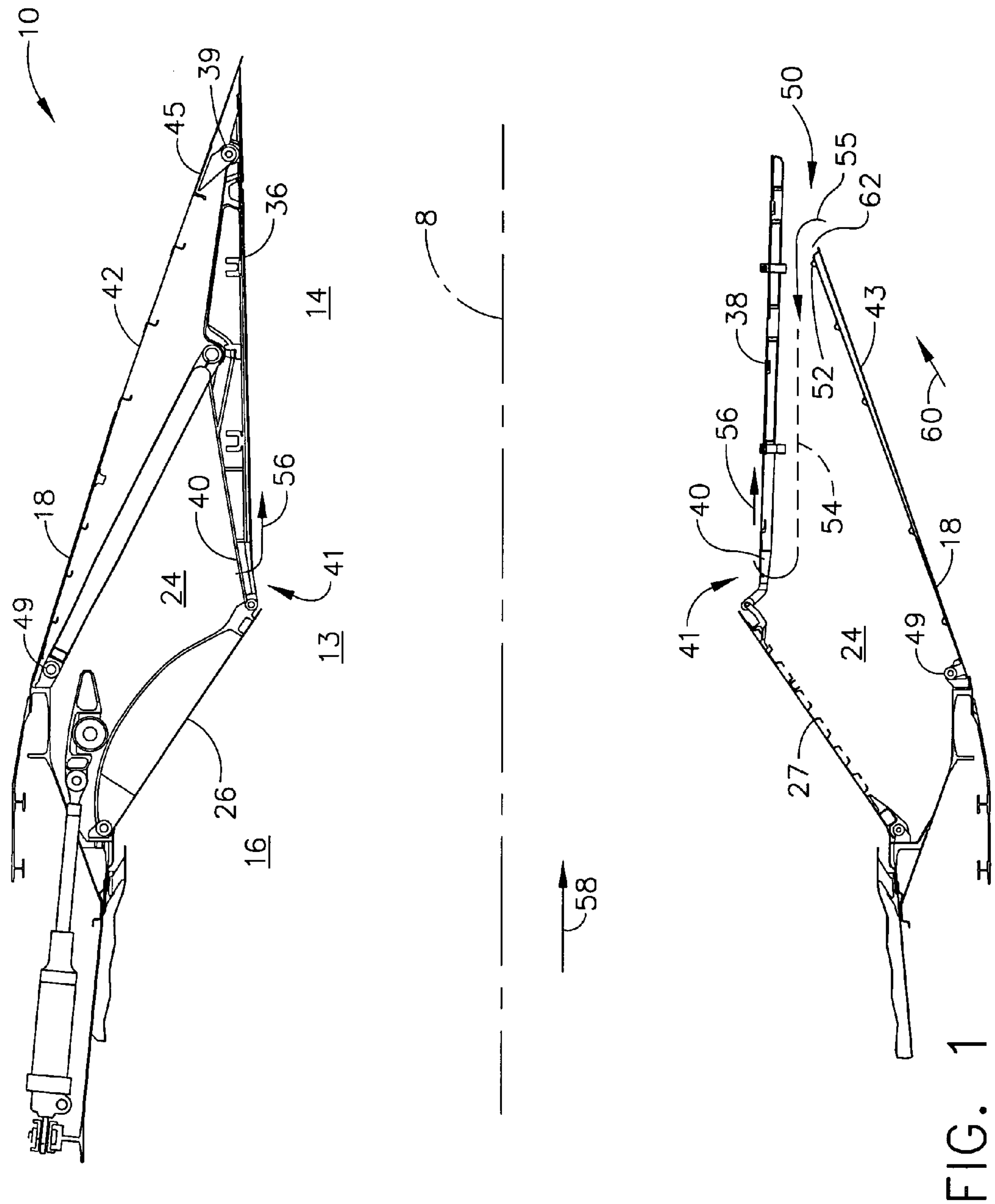
FIG. 1 is a longitudinal sectional view illustration of an aircraft gas turbine engine convergent/divergent nozzle with an ejector and a cooling air flowpath on an outer side of a fairing surrounding the nozzle.

Illustrated in FIG. 1 is an exemplary axisymmetric aftwardly extending variable area aircraft gas turbine engine convergent/divergent (CD) exhaust nozzle 10 circumscribing a nozzle centerline 8. The nozzle 10 includes a divergent section 14 located aft of a convergent section 16 and a throat 13 therebetween circumscribing the nozzle centerline 8. An exterior fairing 18 surrounds and is spaced radially outwardly of at least the divergent section 14 of the nozzle 10. An annular region radially bounded by the divergent section 14 and the external fairing 18 is referred to as a nozzle plenum 24.

The convergent section 16 of the nozzle 10 includes a plurality of circumferentially adjacent convergent flaps 26 and convergent seals 27 pivotably mounted to an outer engine casing 12. The convergent flaps 26 and convergent seals 27 are operable to pivot relative to the centerline axis 8. The divergent section 14 includes a plurality of divergent flaps 36 and divergent seals 38 circumferentially disposed aft of and pivotably connected to the convergent section 16.

The divergent flaps and seals 36 and 38 each includes a cooling air passage 40 which is illustrated in the form of a slot. The cooling air passages 40 are designed to operate together as an ejector 41 located aft of the convergent section 16 to cool the divergent flaps and seals 36 and 38. The exterior fairing 18 includes a plurality of circumferentially adjacent exterior flaps 42 and exterior seals 43. Aft ends 45 of the exterior flaps and seals 42 and 43 are pivotally attached to aft ends 39 of the divergent flaps and/or seals 36 and 38, respectively. The exterior seals 43 may be carried and supported by the exterior flaps 42 and not pivotally attached to aft ends 39 of the divergent seals 38. Forward ends 49 of the exterior flaps and seals 42 and 43 of exterior fairing 18 are pivotally attached to the outer casing 12.

Figure 3:
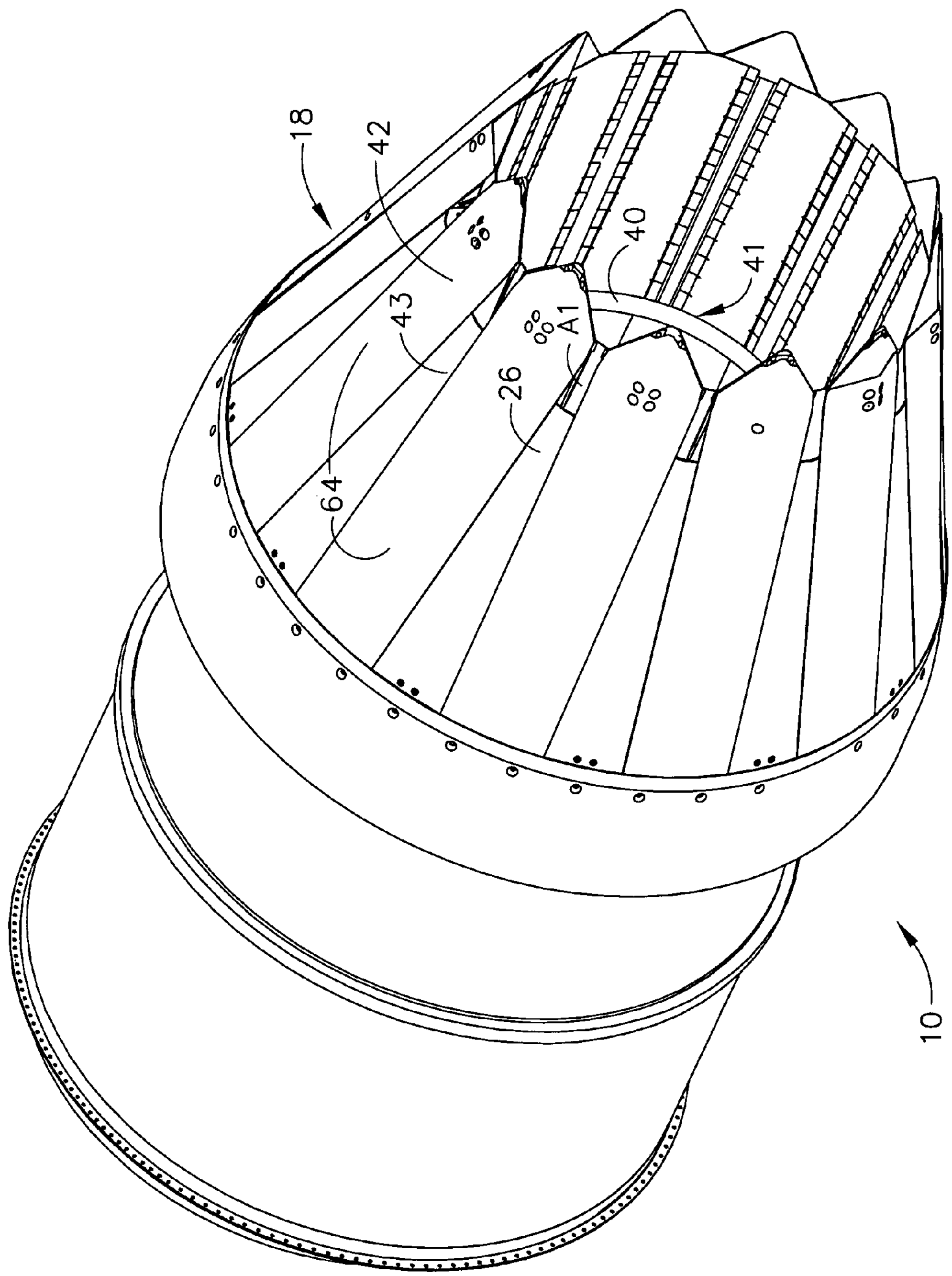
FIG. 3 is a perspective view illustration of the nozzle illustrated in FIG. 1 in a closed position.
Figure 4:
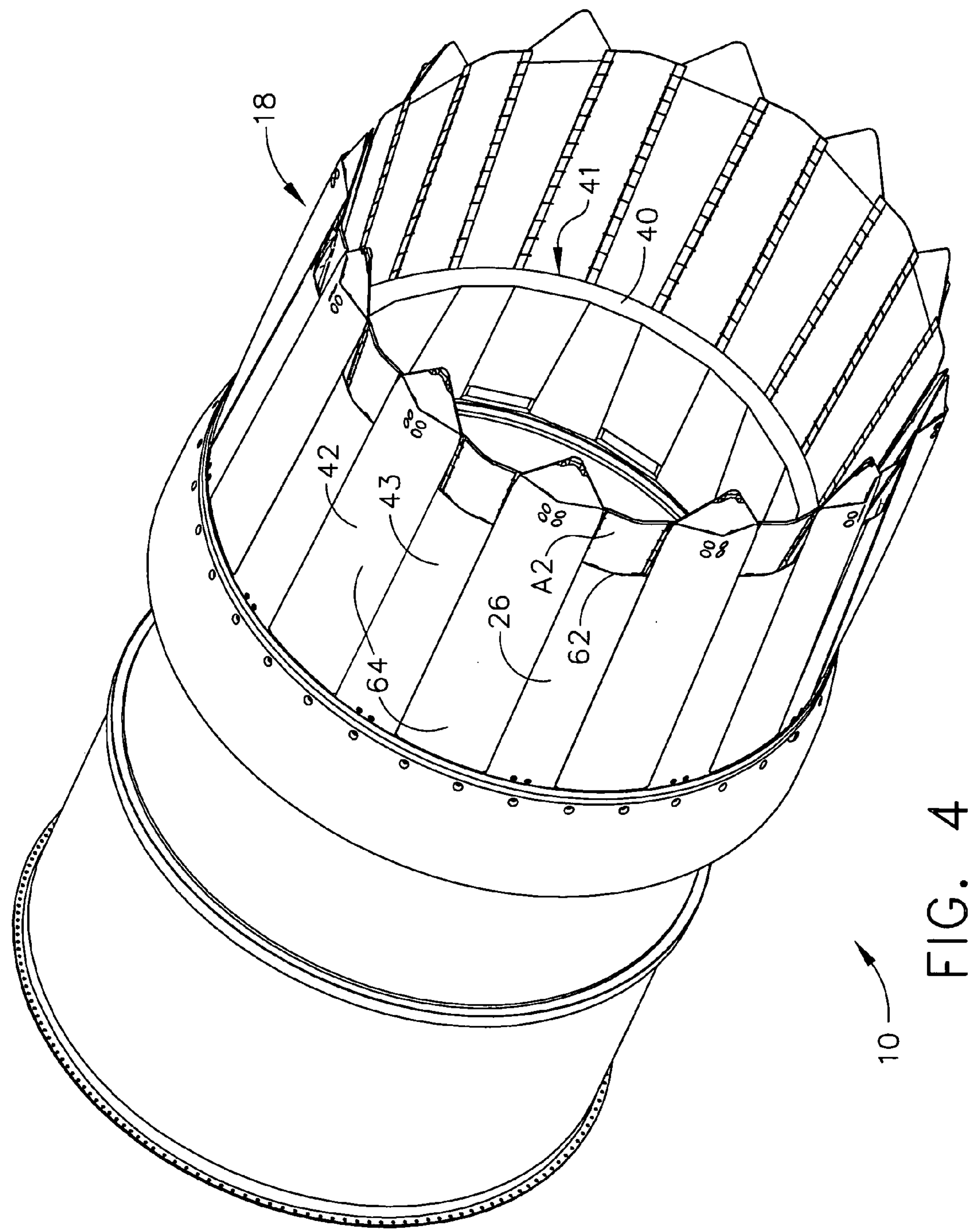
FIG. 4 is a perspective view illustration of the nozzle illustrated in FIG. 1 in an open position.

The ejector cooling air inlet 50 is located in an aft portion 52 of the fairing 18 and permits pressurized cooling air 56 to flow from outside of the fairing 18 into the nozzle plenum 24 and then into the slots or cooling air passages 40 of the ejector 41. Thus, the ejector cooling air inlet 50 together with the nozzle plenum 24 provides an ejector cooling air flowpath 54 for the pressurized cooling air 56 to flow from the outside of the fairing 18 into the nozzle plenum 24 and then into the slots or cooling air passages 40 of the ejector 41. Pressurized air 55 outside of the fairing 18 generally has higher pressure than that of the cooling air 56 through the divergent slot 40 of the nozzle 10 because internal airflow 58 expands and drives the static pressure of the external airflow 60 up. Furthermore, static pressure near the aft end of the nozzle 10 is increased due to high pressures of an expanding exhaust plume that emanates from the nozzle during engine operation. Thus, sufficient static pressure exists at the ejector cooling air inlet 50 to drive the pressurized cooling air 56 from outside of the fairing 18 into the nozzle plenum 24 when the nozzle 10 is open as illustrated in FIG. 4 as well as when the nozzle 10 is closed as illustrated in FIG. 3 and when the nozzle 10 is partially opened.

The ejector cooling air inlet 50 illustrated in FIG. 1 is formed from truncated ends 62 of the exterior seals 43. Each of the truncated ends 62 of the exterior seals 43 is located radially inwardly of and between circumferentially adjacent ones 64 of the exterior flaps 42 as further illustrated in FIG. 3. Opening and closing of the nozzle 10 spreads the circumferentially adjacent ones 64 of the exterior flaps 42 apart and together, respectively. This provides the ejector cooling air inlet 50 with a variable inlet area 68 as is illustrated by a comparison of a first area A1 of the ejector cooling air inlet 50 in the closed nozzle 10 illustrated in FIG. 3 to a second area A2 of the ejector cooling air inlet 50 in the fully opened nozzle 10 illustrated in FIG. 4.

Figure 2:
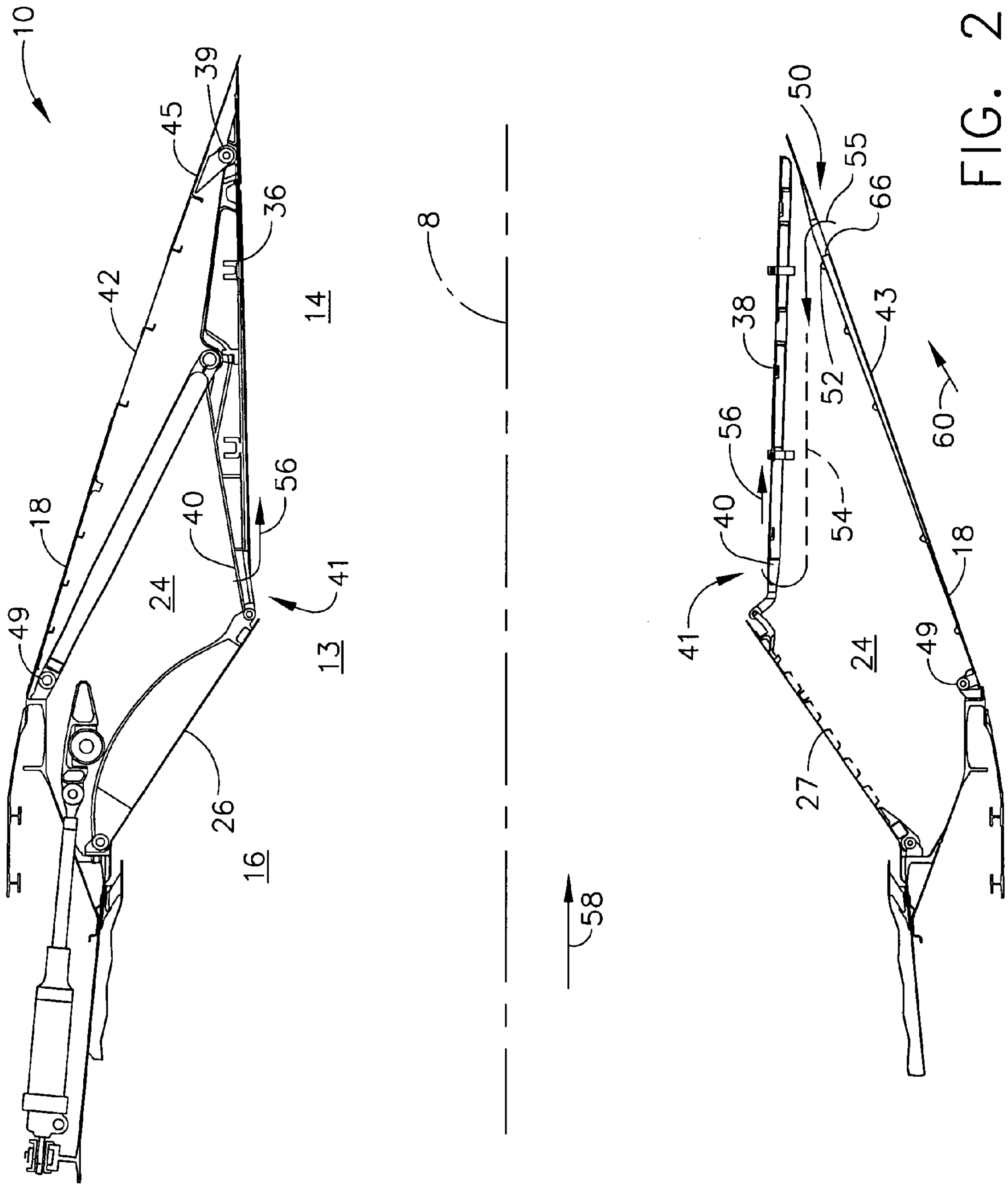
FIG. 2 is a longitudinal sectional view illustration of an alternative embodiment of the nozzle illustrated in FIG. 1.

One alternative ejector cooling air inlet 50, illustrated in FIG. 2, is formed from apertures 66 in the exterior seals 43 and because they are located radially inwardly of and between circumferentially adjacent ones 64 of the exterior flaps 42 the ejector cooling air inlet 50 in this design also has a variable inlet area 68. The nozzle 10 is designed such that the variable inlet area 68 of the ejector cooling air inlet 50 increases in size as the nozzle 10 is opened from a closed position to a partially opened position. The nozzle 10 is also designed such that the variable inlet area 68 remains substantially constant when the nozzle 10 is opened from a partially opened position to a fully opened position.

The exemplary variable area aircraft gas turbine engine convergent/divergent (CD) nozzle 10 described above is illustrated as an axisymmetrical nozzle. However, the variable area aircraft gas turbine engine convergent/divergent (CD) nozzle 10 engine may also be a non axisymmetric nozzle such as a two dimensional nozzle and may also be a axisymmetric vectoring exhaust nozzle.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. A gas-turbine engine nozzle comprising:

a divergent section located aft of a convergent section and a throat therebetween circumscribing a nozzle centerline, an exterior fairing surrounding and spaced radially outwardly of at least the divergent section, a cooling air ejector in the nozzle, and an ejector cooling air flowpath leading from an ejector cooling air inlet in an aft portion of the fairing to the ejector.

2. A nozzle as claimed in claim 1 further comprising an annular nozzle plenum radially bounded by the divergent section and the external fairing and the ejector cooling air flowpath further including the nozzle plenum between the ejector cooling air inlet and the ejector.

3. A nozzle as claimed in claim 2 further comprising:

a plurality of circumferentially adjacent convergent flaps and convergent seals in the convergent section, pivotably mounted to an outer engine casing, and being pivotable relative to the centerline axis, a plurality of divergent flaps and divergent seals in the divergent section, circumferentially disposed aft of and pivotably connected to the convergent section, and the ejector operable to cool the divergent flaps and seals.

4. A nozzle as claimed in claim 3 further comprising the ejector including cooling air passages in the divergent flaps and seals.

5. A nozzle as claimed in claim 4 wherein the cooling air passages are slots.

6. A nozzle as claimed in claim 3 further comprising:

the exterior fairing includes a plurality of circumferentially adjacent exterior flaps and exterior seals, aft ends of the exterior flaps pivotally attached to aft ends of the divergent flaps, and forward ends of the exterior flaps and seals of exterior fairing pivotally attached to the outer casing.

7. A nozzle as claimed in claim 6 further comprising the ejector including cooling air passages in the divergent flaps and seals.

8. A nozzle as claimed in claim 7 wherein the cooling air passages are slots.

9. A nozzle as claimed in claim 6 further comprising truncated ends the exterior seals and each of the truncated ends being located radially inwardly of and between circumferentially adjacent ones of the exterior flaps.

10. A nozzle as claimed in claim 9 further comprising the ejector including cooling air passages in the divergent flaps and seals.

11. A nozzle as claimed in claim 10 wherein the cooling air passages are slots.

12. A nozzle as claimed in claim 6 further comprising apertures in the exterior seals and each of the apertures being located radially inwardly of and between circumferentially adjacent ones of the exterior flaps.

13. A nozzle as claimed in claim 12 further comprising the ejector including cooling air passages in the divergent flaps and seals.

14. A nozzle as claimed in claim 13 wherein the cooling air passages are slots.

* * * * *